United States Patent
Nakhuda et al.

(10) Patent No.: US 11,238,480 B1
(45) Date of Patent: Feb. 1, 2022

(54) REWARDING AFFILIATES

(71) Applicant: Amazon Technologies, Inc., Reno, NV (US)

(72) Inventors: Daryn Edward Nakhuda, Seattle, WA (US); Siddharth Vivek Joshi, Seattle, WA (US); Vishal Bethur Sathyamurthy, Bothell, WA (US); Scott Kerns Windsor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 759 days.

(21) Appl. No.: 14/199,711

(22) Filed: Mar. 6, 2014

(51) Int. Cl.
*G06Q 30/06* (2012.01)
*G06Q 30/02* (2012.01)

(52) U.S. Cl.
CPC .................. *G06Q 30/0222* (2013.01)

(58) Field of Classification Search
CPC ............ G06Q 30/0222; G06Q 30/00–30/0284
See application file for complete search history.

(56) References Cited

U.S. PATENT DOCUMENTS

| | | | | |
|---|---|---|---|---|
| 2004/0088221 A1* | 5/2004 | Katz | ...................... | G06Q 30/02 705/14.13 |
| 2008/0228600 A1* | 9/2008 | Treyz | ...................... | G06Q 20/12 705/26.43 |
| 2009/0299820 A1* | 12/2009 | Wang | ...................... | G06Q 30/02 705/14.16 |
| 2012/0054011 A1* | 3/2012 | Petersen | ............. | G06Q 30/0214 705/14.16 |
| 2013/0066731 A1* | 3/2013 | Finnegan | ................. | H04W 4/21 705/15 |
| 2014/0344109 A1* | 11/2014 | Prindle | .............. | G06Q 30/0633 705/26.8 |
| 2015/0127438 A1* | 5/2015 | Wedderburn | ......... | H04W 4/029 705/14.16 |
| 2015/0227890 A1* | 8/2015 | Bednarek | ......... | G06Q 10/08355 705/26.81 |

OTHER PUBLICATIONS

Dynamic Cloud Pricing for Revenue Maximization, Hong Xu, IEEE vol. 1, p. 160 (Year: 2013).*

* cited by examiner

*Primary Examiner* — Abhishek Vyas
*Assistant Examiner* — Darnell A Pouncil
(74) *Attorney, Agent, or Firm* — Kilpatrick Townsend & Stockton LLP

(57) ABSTRACT

Technology for rewarding affiliates is provided. In one example, a method may include determining a physical location of a computing device. A purchase intent from the computing device while at the physical location may be identified. An affiliate associated with the physical location may be rewarded for the purchase intent.

19 Claims, 8 Drawing Sheets

US 11,238,480 B1

REWARDING AFFILIATES

BACKGROUND

With the increasing availability of the Internet and the World Wide Web, it has become common for merchants to establish electronic sites for marketing and selling goods and services. Consumers can access and place orders from an electronic marketplace that may include includes millions of products.

One issue encountered by merchants operating electronic marketplaces is the inability of customers to physically inspect the goods via the Web site. Often, the customer may be unable to talk to a salesperson with specific knowledge of the goods. As a result, the electronic marketplace may provide access to product reviews, product ratings, and other information that can be relied on by the customer to make an informed decision.

Merchants operating physical marketplaces or retail stores may or may not also operate an electronic marketplace. Customers sometimes visit physical retail stores to view a product or talk to a salesperson with knowledge about the product and then purchase the product through an electronic marketplace due to any of a variety of factors, such as price, availability, or convenience as a couple of examples. In effect, the physical retail store in this example may be used as a showroom for the electronic marketplace from which the operator of the physical retail store receives no monetary benefit. As a result, merchants operating physical retail stores may have some animosity towards the electronic marketplace, which in some examples may be able to offer lower prices because of the lack of a physical presence.

DETAILED DESCRIPTION

Technology for rewarding affiliates with physical presences whose customers purchase through a third party electronic retail store is detailed in this description. In one example, a method may include determining a physical location of a computing device. The computing device may be a mobile device of a customer visiting a merchant at the physical location. A purchase intent may be identified via the computing device at the physical location. The purchase intent may be an action taken by the customer indicating an intent to purchase a product, such as completing an electronic purchase via an electronic marketplace, adding the product to a virtual shopping cart, adding the product to a virtual wish list and so forth. An affiliate associated with the physical location (e.g., a merchant operating a physical retail store at the location) may be rewarded for the purchase intent of the user.

For example, the method may include detecting a physical location of a computing device, such as using a global positioning system, cellular triangulation, Wi-Fi location, and so forth. The physical location of the computing device may be correlated to an affiliate based in part on a known location of the affiliate. For example, the computing device may be considered to be at the affiliate's location if the device is identified as being within a predetermined radius of a geographical coordinate or other location identifier for the affiliate's location. When the device is verified as being at the physical location and a purchase intent is received with respect to an electronic store or marketplace from the computing device while at the physical location, the affiliate may be rewarded with a reward upon a completed purchase via the electronic store resulting from the purchase intent. The affiliate may be rewarded whether the purchase is completed when the computing device is at the physical location or elsewhere as long as the purchase intent is received while the computing device is at the physical location. The technology may thus provide a benefit to affiliates who provide a physical store location even when a customer makes a purchase through an electronic store rather than the physical store.

Figure 1:
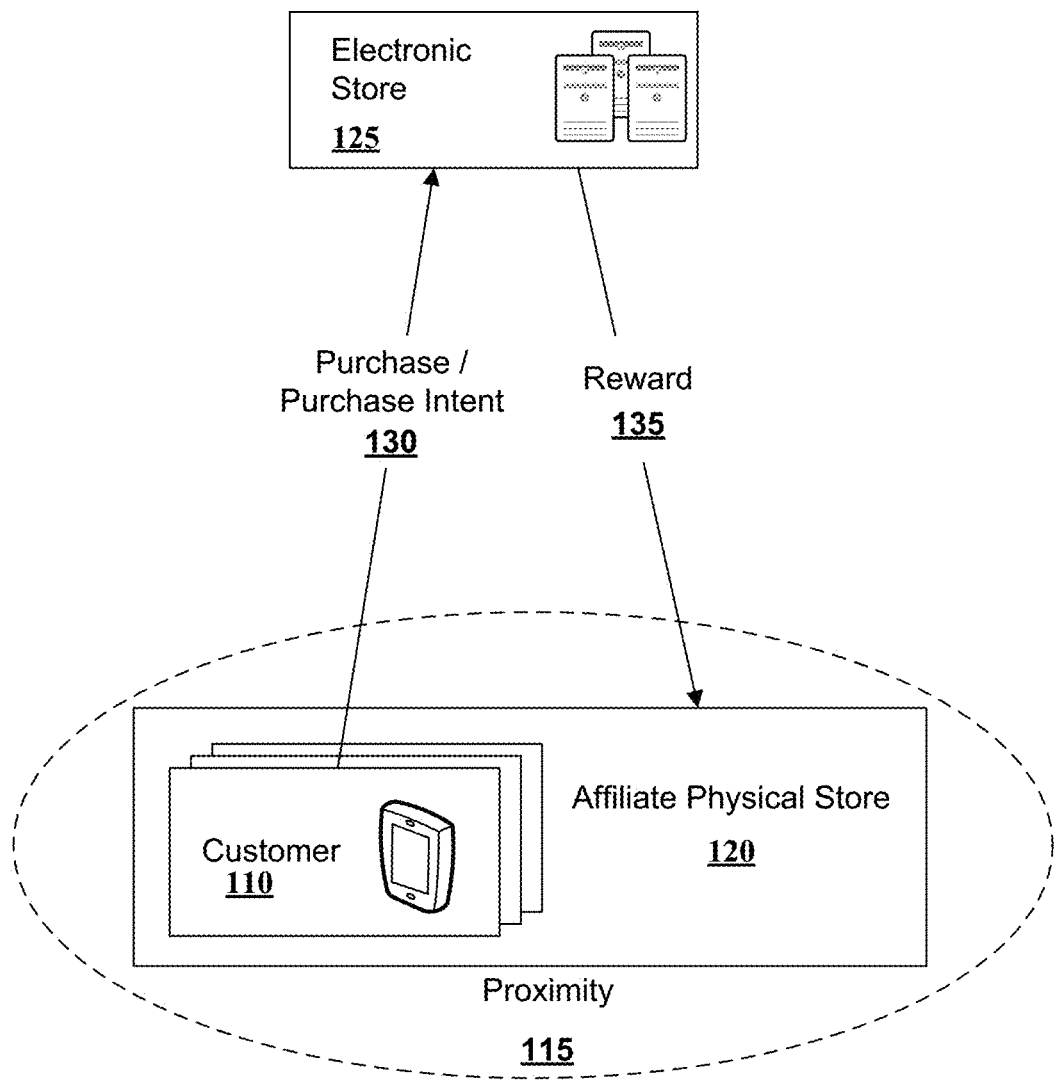
FIG. 1 is a schematic overview of a system for rewarding an affiliate for purchases made at an electronic store with which the affiliate is affiliated based on a purchase intent expressed by the customer while at a physical store of the affiliate in accordance with an example of the present technology.

FIG. 1 illustrates an overview of a system or interaction for rewarding an affiliate (see affiliate physical store 120) with a reward 135 based on a purchase intent 130 of a customer 110 in proximity 115 to the affiliate. The electronic store 125 may provide an affiliate program through which merchants with a physical store location may register to be rewarded when the physical presence results in a purchase made through the electronic store 125. When the merchant registers for the affiliate program, the merchant may provide location information for the physical store. The merchant may be asked to provide verification of the location information to verify that the provided location information is accurate. The merchant may be asked to identify specific products or at least product types, categories, brands or the like that will be sold at the physical location by the merchant. This may reduce a number of false rewards where, for example, a customer shops for and purchases a clothing item at the electronic store 125 while being located within a video game store. Once a registration is complete, the merchant may be a registered affiliate of the electronic store 125.

Purchases made at the electronic store 125 by customers 110 visiting the physical location of the affiliate 120, or within a defined perimeter of the physical location of the affiliate 120, may result in a reward 135 to the affiliate 120 from the electronic store 125. In one aspect, the reward 135 may be provided when a purchase 130 is completed at the physical location. In another aspect, the reward may be provided regardless of where the purchase is completed when a purchase intent 130 is identified from an electronic device at the physical store and the purchase intent 130 is associated with a customer account of the customer 110 for the electronic store 125.

The purchase intent 130 may be a purchase or may be something other than a purchase that indicates an intent of the customer 110 to complete a purchase. For example, a purchase intent 130 may include completion of a part of a purchase process, such as adding an item to a cart, calculating shipping costs, registering for an account while viewing a product page at the electronic store, logging in to an account while viewing a product page at the electronic store 125, entering payment information and so forth. In other examples, the purchase intent 130 may be independent of the purchase process. For example, the purchase intent 130 may include the addition of the product to a wishlist, sharing the product page or information about the product on social media, discussing the product in a virtual product forum, and so forth. Yet other examples may include scanning or capturing images of barcodes, Quick Response (QR) codes, Near Field Communication (NFC) tags, Universal Product codes (UPC), the products, and so forth. Any of a variety of other activities or actions not listed here may also constitute a purchase intent. The electronic store may select activities or actions to qualify as a purchase intent and these activities or actions may vary between electronic merchants, or an electronic merchant may select to enable or disable various specific activities or actions for one affiliate differently than for another affiliate.

Depending on the type of purchase intents 130 permitted for a particular application, the electronic store 125 may perform monitoring to capture and identify the purchase intent 130. For example, the electronic store 125 may request and be granted access to the customer's social media accounts to monitor for status updates or discussions about a product. The electronic store 125 may be granted access to a camera and/or photo gallery of the customer's computing device to monitor for barcodes, products and the like. A variety of monitoring methods may be implemented as would be suitable for monitoring for a specific type of purchase intent, some of which may involve obtaining permission for the monitoring from the customer. When the purchase intent 130 involves a portion of a purchase process or some other interaction with the electronic store 125 deemed indicative of purchase intent, the purchase intent 130 may be identified in the absence of any monitoring, special permissions and so forth.

Identifying or detecting a physical location of a computing device may ensure that a purchase intent 130 occurs or is received while the computing device of the customer 110 is at the physical location of a known affiliate 120. The computing device may be a computing device this is owned or is in the possession of the customer 110. The computing device may be a mobile computing device, such as a smartphone, tablet, e-reader, netbook, notebook, laptop or any other type of computing device. In other examples, the computing device may be provided by the affiliate to facilitate electronic purchases, such as electronic purchases through the electronic store. Such a computing device may be a mobile or non-mobile computing device, such as a tablet, desktop or other computing device. Regardless of the type or ownership of the electronic device, a physical location of the electronic device may be identified through any of a variety of methods. Some example technologies for identifying a physical location of an electronic device include global positioning system (GPS), cellular triangulation, Wi-Fi location, and so forth. For example, GPS or cellular triangulation may be used to determine an approximate location of the electronic device, within a margin of error. GPS may provide a location for the computing device to an accuracy of within 25 feet. Wi-Fi location technologies may provide positioning with wireless access points based on a measure intensity of a received Wi-Fi signal. The accuracy may depend on a number of Wi-Fi positions (e.g., access points or hubs) that have been entered into a database.

In other implementations, a location may be identified through other technologies. For example, a customer may utilize a mobile electronic device to "check in" at a physical location. This "check in" data may be the basis for identifying the location of the mobile device. In another example, a customer may scan a QR code, recognize an NFC (Near Field Communication) tag, connect to a Bluetooth device, connect to an affiliate Wi-Fi network or perform any of a number of other actions that may be based on a physical presence at the physical store (where the QR code, NFC tag, Bluetooth device, Wi-Fi network, etc. are available to customers at the physical store). Identifying an internet protocol (IP) address of the computing device or a network to which the computing device is connected may be used to identify the location.

The physical location of the affiliate 120 may be defined narrowly or broadly as follows: to cover a well-defined area corresponding to the physical store, to cover an area generally in the location of the store, to identify a particular region surrounding the physical store and so forth. The definition of the physical location for purposes of rewarding the affiliate may be based on any of a number of factors, such as preferences of the electronic store, proximity of the affiliate to other affiliates, affiliate density in an area, population density around the affiliate, type of product being sold and so forth. For example, where two affiliates selling similar products occupy physical locations adjacent to one another, the boundaries for the physical locations used for rewarding the respective affiliates may be carefully defined. Where the two affiliates are adjacent to one another but sell different types of products, the boundaries may be more broadly or generally defined because attribution may be determined according to the type of product identified with the purchase intent.

With the location of the affiliate physical store 120 and the location of the computing device of the customer 110 known and/or identified, as has been described, a determination may be made as to whether the location of the computing device is at the location of the affiliate or a geographic area defined for the affiliate, at least within a defined margin of error. When the location of the computing device and the location of the affiliate are determined to sufficiently correspond, a purchase intent identified while the computing device is at the location of the affiliate may result in a reward to the affiliate.

In one example implementation, a process may proceed by identifying a purchase intent from a computing device, identifying a location of the computing device in response to the purchase intent, searching for an affiliate associated with the location of the computing device, identifying an affiliate at the location of the computing device, and rewarding the affiliate when a purchase is complete.

In another example, a process may proceed by monitoring a location of a computing device, comparing the monitored location to known affiliate locations, monitoring for a purchase intent when the monitored location sufficiently corresponds to a known affiliate location, identifying a purchase intent, and rewarding the affiliate when a purchase is complete.

Any of a variety of other process implementations which would occur to one of ordinary skill in the art, including but not limited to variations or modifications to the process implementations described herein, are also considered to be within the scope of this disclosure.

The affiliate 120 may be rewarded 135 when the purchase is complete. The reward 135 may be instantly provided upon completion of the purchase or may be provided with a delay or at a specified time in the future. For example, the reward 135 may be provided after a product has been shipped to the customer, after the product has been delivered to the customer, when the customer fails to return the product within a specified time period, or at any other suitable time after the purchase is complete.

The reward 135 may be any of a variety of types of rewards. For example, the reward 135 may be a monetary award. The monetary reward may represent a percentage of a purchase price or a percentage of the electronic retailer's profit from the purchase. The reward may include credits, products, services or other tangible or intangible valuable consideration. For example, the electronic store 125 may provide a virtual storefront for the affiliate 120 for a fee (or for free) or may provide physical products for display at a physical storefront by the affiliate 120, and the cost of the products may be offset, credited, paid for or otherwise provided as a result of purchases made by customers 110 indicating or expressing a purchase intent 130 while at the physical storefront of the affiliate 120.

The affiliate 120 may be rewarded based on identification of the purchase intent 130 of the customer 110 while at the physical location. In some examples, the affiliate 120 may be rewarded with different rewards based on whether a purchase is completed. For example, a smaller reward may be provided when a product is added to a virtual shopping cart but is ultimately not purchased as compared with a larger reward that may be provided when the product is added to the virtual shopping cart and a purchase is completed.

The affiliate 120 may be rewarded when a purchase is completed, whether the purchase is completed at the physical location or elsewhere if the purchase intent is received while the computing device is at the physical location. For example, a customer 110 may visit the affiliate's physical location and scan a product barcode to view information about the product on a mobile computing device, but even if the customer 110 does not complete the purchase at the physical location, the affiliate may still receive credit if the user completes the purchase at some other location, such as at the user's home or even a competitor's physical location, for example.

Whether to reward an affiliate 120 for a purchase made at a separate location from the affiliate 120 may depend on one or more factors. For example, if the product information was viewed using an internet browser at the affiliate's 120 location and the browsing session is still active, then the reward may be provided for a completed purchase. In another example, if the product was added to a virtual shopping cart but then removed (even if subsequently re-added and purchased), then the reward may be withheld. In another example, passage of time may dictate whether to reward an affiliate. The greater the passage of time from the purchase intent, the less likely the purchase is to have resulted from the provision of the physical location by the affiliate, or at least the nexus between the purchase and the purchase intent at the physical location becomes more vague and tenuous. For example, a purchase within an hour of the purchase intent is more likely attributable to the visit to the affiliate's location than a purchase completed two weeks after the visit to the affiliate's location. Any of a variety of other factors may also be considered.

The various factors considered in determining whether to reward the affiliate for the purchase may be used together to reach a determination. For example, while passage of time may indicate a lack of nexus between a purchase and the purchase intent, keeping the product in the virtual shopping cart during the passage of limited amount of time may lend towards the nexus between the purchase and purchase intent. However, if the customer visited a number of other electronic and/or physical stores during the passage of time, these visits may lead away from a connection to the original affiliate. In other words, any of a number of factors may be balanced against one another to determine whether a nexus is likely present between the purchase and the purchase intent. After determining a likelihood of the nexus, the likelihood may be compared against a predetermined threshold for rewarding the affiliate. For example, if a threshold is set at 80% likely that a causal relationship exists between the purchase intent and the purchase, then determined likelihoods of 80% or greater may result in a reward to the affiliate and determined likelihoods of less than 80% may result in withholding the reward from the affiliate.

The electronic store 125 may be available as a website, a mobile application or any other suitable configuration. The electronic store 125 may provide functionality to allow customers 110 to purchase products, including products selected from websites of affiliates. The electronic store 125 may be operated by a business entity that handles the various order processing, shipping, collections, and customer service tasks associated with the sale of goods or services.

The electronic store 125 may enable a registration process for allowing other entities (individuals, companies, merchants, etc.) to register as affiliates 120. An entity enrolling as an affiliate 120 may provide the electronic store with a completed, online registration application that is processed by an enrollment or registration module. The registration module may create an entry in an affiliate database according to the information provided by the enrolling affiliate.

Because the electronic store 125 may provide an automated architecture for doing business with affiliates 120 (such as affiliate enrollment, transaction processing, reward tracking, payment and so forth), the electronic store 125 may do business with large numbers (e.g., hundreds, thousands, tens of thousands, etc.) of affiliates 120 with minimal supervision or interaction. Further, because the rewards 135 provided to the affiliates 120 are performance-based, there is little or no downside to the merchant in enrolling marginally-productive affiliates 120 from whose customers 110 a relatively small number of customers complete purchases through the electronic store 125.

During the expression of purchase intent 130 by the customer 110 or during completion of an order process, the affiliate 120 and/or electronic store 125 may not have access to the customer's personal information (name, address, credit card number, etc.). When an order is submitted, or in some instances when the purchase intent is expressed, the electronic store 125 may have or obtain access to at least some of the customer's information, or alternatively, this information may be withheld from the affiliate 120.

Figure 2:
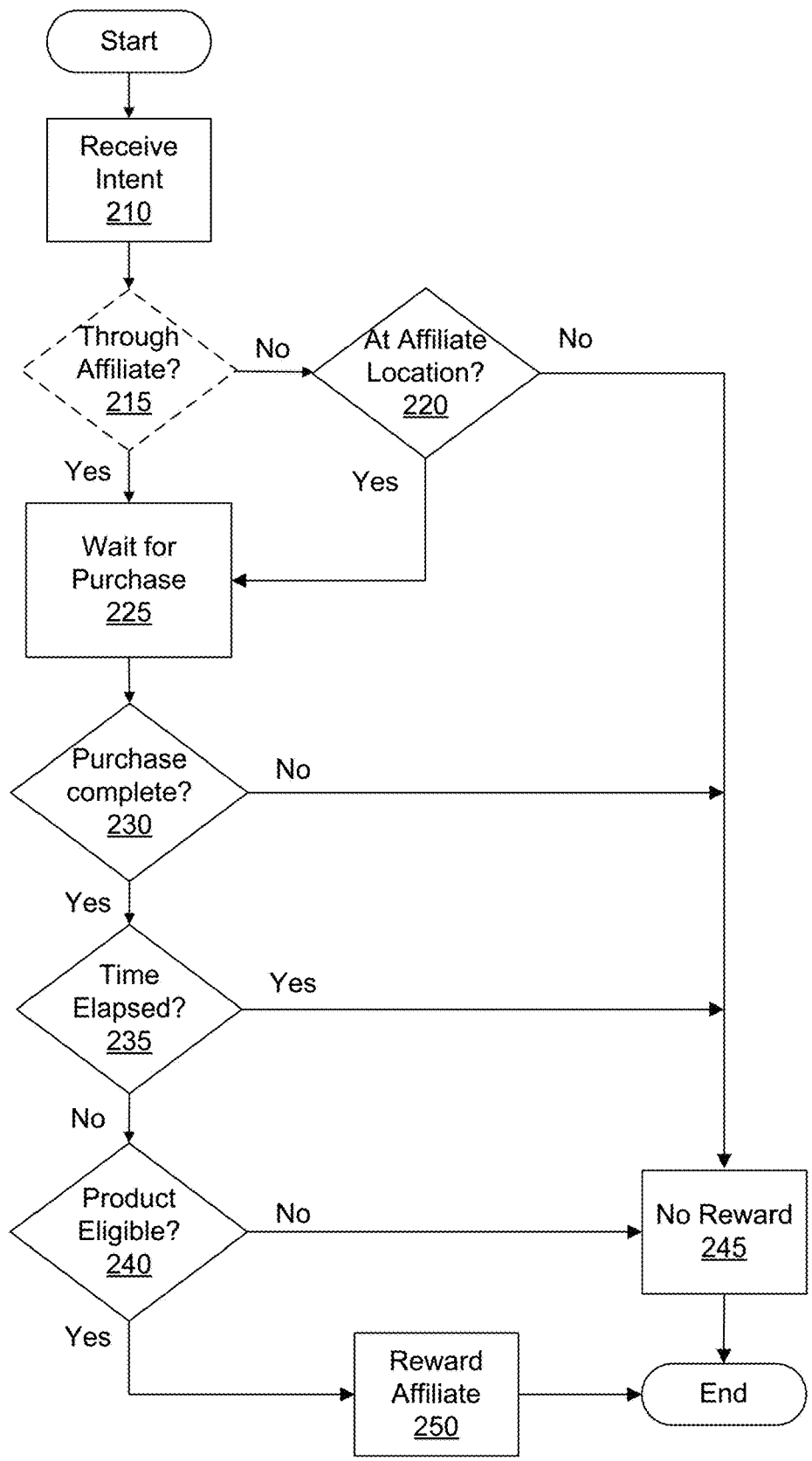
FIG. 2 is a flow diagram for rewarding an affiliate in accordance with an example of the present technology.

Referring now to FIG. 2, a decision diagram illustrates a flow of an example process for interactions between a customer, an affiliate, and an electronic store, such as the interactions described with respect to FIG. 1, for example. While FIG. 2 illustrates the process as occurring in a particular order, or through specific steps, the process may be completed in any other suitable order or using any other suitable steps consistent with the present technology.

The diagram begins with the receipt or identification of a purchase intent 210 of a customer. Affiliates may operate a website, provide a computing device, or otherwise make resources available to customers for completing a purchase.

In this example, the process can determine whether the purchase intent was received through an affiliate resource 215. When the customer expresses the purchase intent using the affiliate website, for example, the affiliate may be rewarded for a completed purchase based on the purchase intent when the affiliate website sources order processing and the like to the electronic store. When a purchase or purchase intent is received through the affiliate resource, determination of the co-location of the electronic device from which the purchase intent is received with the physical location of the affiliate may be unnecessary. More specifically, the identification of the affiliate through the use of the affiliate resource (e.g., an affiliate hardware device or an affiliate retail site) may optionally override location data which may otherwise be used in determining whether a purchase intent is received within the physical location of the affiliate. In other examples, however, physical location of the customer may be identified through the use of the affiliate resource, such as when the affiliate resource is a computing device, wireless network, etc. because the location of the affiliate resource may be known to be at the affiliate physical location. The affiliate may register or identify affiliate resources with the electronic store, such as during or after the affiliate registration process, where the affiliate resources are to be made available to customers for use at the physical location for providing product information, enabling purchases and so forth. Many affiliates may not offer such an affiliate resource to customers for completing purchases and/or a customer may choose to complete the purchase through the electronic store using a personal mobile device rather than use the affiliate resource. Determining co-location of the electronic device from which the purchase intent is received with the physical location of the affiliate may enable reward to be provided to affiliates who do not offer the resource or who offer a resource that is not used by customers.

Accordingly, when the purchase intent is not through the affiliate resource, or even when the purchase intent is through the affiliate resource, a determination may be made as to whether the purchase intent was received or identified while the customer was at the affiliate physical location 220. When the purchase intent is not through the affiliate resource or at the affiliate physical location, a determination may be made that a reward will not be provided to an affiliate for completion of an order 245. However, when the purchase intent is through the affiliate resource or at the affiliate physical location, the process may proceed to wait for a purchase 225 (when the expressed purchase intent does not include the purchase). Because the use of an affiliate resource may, in some examples, be used to determine physical location of a customer, steps 215 and 220 may be a single step leading to the wait for the purchase 225, or step 215 may be optionally omitted.

Identification of a purchase intent may be useful in determining whether the presence of the physical location likely contributed to a purchase. For example, a customer may drive past an affiliate physical location while a GPS is tracking the physical location of a mobile device carried by the customer, and the customer may subsequently make a purchase through the electronic store. However, because a purchase intent was not received while the customer was at the affiliate physical location, a reward may not be provided to the affiliate.

At some time after the purchase intent is received, a determination may be made as to whether a purchase was completed based on the purchase intent 230. If no purchase was completed, then a reward may not be provided to the affiliate 245. A determination may be made as to how much time has elapsed 235 between the purchase intent and a completed purchase. In other words, a determination may be made as to whether predetermined time period in which the affiliate may be rewarded for the purchase has elapsed 235 or expired. For example, a brief period of time between when a purchase intent was expressed at the affiliate physical location and completion of the purchase may suggest a nexus between the purchase intent and the physical location, resulting in a reward to the affiliate. A longer period of time between when the purchase intent was expressed at the affiliate physical location and completion of the purchase may suggest a lack of nexus between the purchase intent and the physical location, resulting in not providing the reward to the affiliate. While not limited to a specific time amount, a time period such as minutes, hours, or up to a couple of days may be a short time period useful for establishing the nexus, while a time period of multiple days up to weeks, months or a year may suggest a lack of nexus. The time periods may vary for different affiliates, product categories, seasons, price of products and so forth. For example, a product valued at five dollars may have a time period for establishing the nexus of a few hours while a product valued at five thousand dollars may have a time period of up to a couple of weeks where the nexus may assumed. Larger product purchases, being larger in size or cost, may typically involve a greater period for contemplating completion of the purchase than smaller product purchases, being smaller in size or cost.

In some examples, the virtual shopping cart provided to a customer by the electronic store may monitor open entries (non-closed shopping carts) in a shopping cart data store. The shopping cart data store may include information such as a customer identification, the date the shopping cart was opened (open date; i.e., the date on which a product was added to the shopping cart), the date last accessed (touch date), etc. The shopping cart data store may be monitored in order to purge shopping carts that have been inactive (untouched) for a pre-defined period of time, such as one week for example. When the purchase intent includes the addition of a product to the shopping cart, the time period for determining nexus of a purchase to the purchase intent in order to reward the affiliate may be based on the time point at which the shopping cart is purged, the date the shopping cart was last accessed, the date the shopping cart was opened, and/or any of a variety of other shopping cart related data.

Another consideration for rewarding affiliates for completed purchases may be whether the affiliate sells the product purchased by the customer 240. For example, if a customer sits down in a reading section of a book store affiliate to browse the electronic store and purchases a pair of shoes advertised on sale by the electronic store, the affiliate may not be rewarded for the purchase if the affiliate does not sell shoes, or if the affiliate does not sell the particular pair of shoes purchased. As described previously, when registering as an affiliate, the affiliate may register specific products, product categories or the like. This registration may be an identification of reward eligible products or product categories. While registration of the products or categories is described with respect to various example implementations of the present technology described herein, this registration in each instance may differ from the customer registration of new products and rather may refer to the identification of products which the affiliate desires to be eligible to result in a reward to the affiliate when purchased. These products or product categories may thus form a basis for determining whether the affiliate should be rewarded for purchases through the electronic store when the purchase intent is expressed while at the physical location of the affiliate. In one example, even if specific product is not registered to or available through the affiliate, but a purchase intent is received for a product similar to one offered by the affiliate and the purchase intent for the product is received while the computing device of the customer is co-located with the affiliate's physical location, then the affiliate may be rewarded. In other words, even when an affiliate registers specific products, the electronic store may optionally generalize these products to broader or more general product categories to provide additional benefit to affiliates.

After applicable details of a transaction have been considered, such as the location of the purchase intent 220, completion of the purchase 230, elapsed time 235 from purchase intent to purchase, purchase of a product sold by the affiliate 240, and so forth, a completed purchase satisfying applicable criteria may result in a reward to the affiliate 250. The electronic store may calculate the affiliate reward. The reward may be calculated in any of a number of ways depending on the affiliate and electronic store relationship, and may be provided to the affiliate on a periodic basis, such as at the end of each calendar quarter. For example, the affiliate may be paid a fixed percentage of the list selling price of the product purchased. Monetary reward payments or other reward provisions may be made automatically using an appropriate electronic payment or provision method.

A single customer virtual shopping cart may include line items (e.g., multiple products) with purchase intent attribution to multiple different affiliate physical locations. For example, the customer may visit a first affiliate and add an item to the virtual shopping cart and then visit a second affiliate and add a second item to the virtual shopping cart. The customer may subsequently complete a purchase of the first and second items in a single transaction. The purchase of the first item may result in a reward to the first affiliate and the purchase of the second item may result in a reward to the second affiliate. Because the virtual shopping cart tracks purchase intent attribution, the affiliates can efficiently be credited for purchase intent received for products or services at the respective physical locations upon order submission or completion, without the customer performing multiple "check-outs."

In another example, a customer may visit a first affiliate and express a purchase intent, such as adding a product to a virtual shopping cart. The customer may subsequently visit a second affiliate and then complete the purchase. Rewarding the affiliate may be based on reward rules for determining which affiliate to reward and/or how to split a reward between multiple affiliates. If the second affiliate does not sell the product added to the virtual shopping cart while at the first affiliate location, then the reward may be provided to the first affiliate. If it is unclear which of the affiliates should receive the reward, the reward may be split between the affiliates or may be withheld from both affiliates. When the reward is split, the reward may be evenly or unevenly distributed between the affiliates, based on a level of perceived contribution, such as where the purchase intent occurred, which affiliate provided the latest interaction with the customer and so forth. If the customer expresses a purchase intent for a same product at multiple affiliates, rules may govern whether the latest purchase intent results in a reward, whether the reward is split, how the reward is split, which purchase intent signifies a stronger intent to purchase and so forth. For example, addition of a product to a wishlist at a first affiliate and then addition of the product to a shopping cart at the second affiliate may result in the reward going to the second affiliate, or at least a greater portion of the reward going to the second affiliate, because addition of the product to a shopping cart may be a stronger indicator of intent to purchase than addition of the product to a wishlist, and also because the second affiliate was latest in time.

As will be appreciated from the foregoing, the virtual shopping cart of the electronic store enables the customer shop in whatever manner is convenient or desired by the customer while seamlessly benefitting affiliates visited by the customer during the shopping experience. The nature of the shopping experience allows the customer to shop for products based on the marketing expertise of the affiliates, while conveniently utilizing the electronic store's order fulfillment resources.

Reference will now be made to FIGS. 3A-3D. FIGS. 3A-3D illustrate different example implementations where a purchase is made from an electronic store based on a visit of a customer to a physical store of an affiliate.

In operation, the customer may access the electronic store using an internet browser 305, such as Chrome, Firefox, Safari, Internet Explorer or the like, and the browser may use the Hyper Text Transfer Protocol (HTTP) to communicate with a server for the electronic store. The server may access a local store of catalog documents, images, audio, video or other resources (such as in the form of Hyper Text Markup Language (HTML) documents) which can be requested, retrieved and viewed by the customer via the browser. These catalog documents may include information generated by the electronic store about the various products featured on the electronic store. This information may include editorial descriptions, reviews, and/or recommendations of the products that assist customers in making informed purchasing decisions.

The catalog documents served by the electronic store may include hyperlinks allowing consumers to select products for prospective purchase. When a customer selects (e.g., clicks on) the hyperlink associated with a particular product, the customer may be presented with various options for allowing the customer to purchase the selected product from the electronic store.

Various information may be collected to determine whether a computing device used in expressing a purchase intent or in completing a purchase is present at a physical location of an affiliate. For example, and with reference to FIG. 3A, when navigating to the electronic store using the internet browser, a background process may provide location information of the electronic device to the electronic store. The tracking of a location or the provision of a reward to the affiliate based on the tracked location may be invisible to the customer. In other words, to the customer, the electronic store shopping experience may appear to be the same whether expressing purchase intent at the affiliate store, at home or anywhere else.

In some examples, the electronic store, upon recognizing the location of the electronic device at an affiliate physical location, may redirect or modify the Uniform Resource Locator (URL) 310*a* to refer to the affiliate. For example, FIG. 3B illustrates an example where the URL 310*b* has been appended with a string referencing affiliate number '163'. As another example, FIG. 3C illustrates an example where the electronic store URL 310*c* has been prepended with an affiliate identifier. FIG. 3D illustrates an example where the electronic store URL 310*d* has been replaced with the affiliate URL. The example of FIG. 3D may be used where the affiliate website operates as a front for the electronic store providing the backend order processing and fulfillment. Rather than modifying the URL to identify the affiliate, as in these examples, another implementation may be to modify the URL to identify the location. The URL may be modified based on the physical location to include latitude and longitude coordinates or any other suitable location identifier.

In some examples, rather than the electronic store modifying or redirecting the URL in the browser, the affiliate may modify or redirect the URL, such as when the customer attempts to connect to the electronic store using an affiliate resource, such as an affiliate wireless network, an affiliate computing device and so forth. A server, router, computing device or other device or architecture may facilitate the modification or redirection of a URL 310*a* entered into the browser as in FIG. 3A to a URL 310*b*-310*d* such as those illustrated in FIGS. 3B-3D.

In one example, the hyperlinks of the electronic store's catalog documents may be provided in association with additional information which may be embedded in a predefined format within the associated URL 310*a*-310*d*. The additional information may include reference to the affiliate as in FIGS. 3B-3D, or may include location information or any other suitable or useful information for indicating the purchase intent of the customer at the affiliate's physical location. As shown in FIG. 3B, this information in the URL 310*b* may include a unique identifier of the affiliate (which may be assigned upon enrollment or registration as an affiliate with the electronic store) and a unique identifier of the selected product (such as a product identifier for the shoe illustrated on the web page of FIG. 3B). The electronic store may use this information to identify the affiliate that the customer visited when expressing the purchase intent and to credit the sale to the affiliate, if the customer subsequently purchases the product or group of products. In other implementations, the rewarding of the affiliate may occur whether the product is purchased or not, if the purchase intent is received while the customer is at the affiliate physical location, as has been described previously. Reward or commission payments may be paid to the affiliates on a periodic basis and may be paid automatically and electronically without manual involvement by the operator of the electronic store.

The electronic store may utilize a product information data store that stores product pricing information. The electronic store may use this pricing information to calculate the proper reward for any particular purchase. Although the implementation described in this example may use monetary commissions to compensate the affiliates for providing a physical presence, other forms of compensation may be used. For example, an affiliate (and/or the affiliate's customers) may be given a discount on products or services sold by the electronic store.

FIGS. 3A-3D illustrate a hyperlink in the form of an image of a shopping cart 315 for a customer to view contents of the virtual shopping cart. When a customer selects a 'purchase' 320 or 'add to cart' button, the product associated with the button 320 may be added to the virtual shopping cart and may be available for review during a checkout process or when the customer clicks on the image of the shopping cart 315.

The virtual shopping cart may be a customer-specific data structure that is generated and maintained (such as within a shopping cart data store) by executable code of the electronic store. The data store may be any type of data repository as may be described in further detail later. The information stored within the shopping cart may include a list of the products that have been selected by the customer for prospective purchase, together with an identifier of the affiliate (if any) corresponding to each such product associated with a location at which a purchase intent for each such product was expressed. In one implementation, the virtual shopping cart may persist at the electronic store for an extended period of time (e.g., one week) following a most recent access of the virtual shopping cart by the customer, allowing the customer to conduct extended shopping sessions. When the customer proceeds to a check-out area of the electronic store and submits an order for the selected products, the affiliate identifiers stored within the customer's shopping cart may be used to appropriately credit the accounts of the affiliates contributing to the purchase through provision of a the physical presence. Although this shopping cart implementation provides an efficient mechanism for tracking and rewarding affiliates, affiliates can alternatively be rewarded without the use of a shopping cart, such as by tracking or monitoring purchases and purchase intents independently of the shopping cart.

Because the identity of the customer may be unknown to the electronic store at the time of the purchase intent, such as when the customer has not logged in to the electronic store with the customer's account, the electronic store may use cookies technology to identify the customer, so that the customer can be associated with any purchase intents expressed during a visit to the affiliate physical location. The process may involve retrieving the cookie from the customer computing device with the web server, and then comparing the cookie against information stored in a customer data store. If no shopping cart exists for the customer, or if no cookie exists on the customer computing device, a shopping cart structure may be created for the customer and may be subsequently associated with identifying customer information when the customer registers with or logs in to the electronic store. Any of a variety of alternative techniques may also be used to identify the customer, including prompting the customer for a user ID, using URL information returned by the customer's web browser and so forth.

Figure 3A:
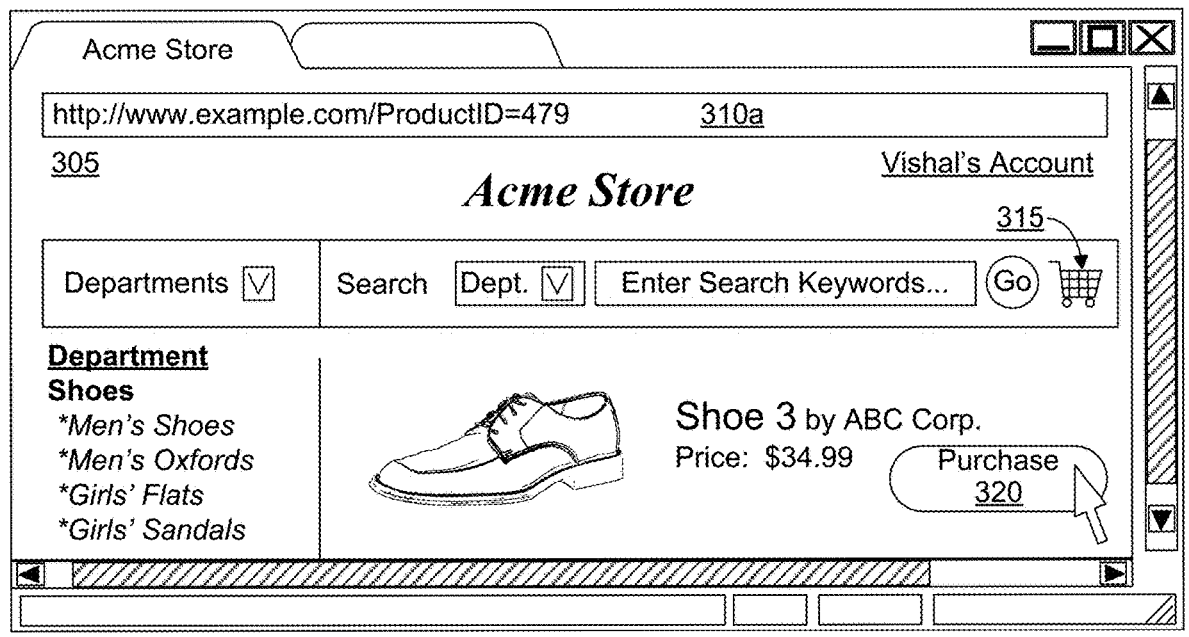
FIGS. 3A-3D illustrate graphical user interfaces for customer interactions with an electronic store while at an affiliate physical store in accordance with examples of the present technology.
Figure 3B:
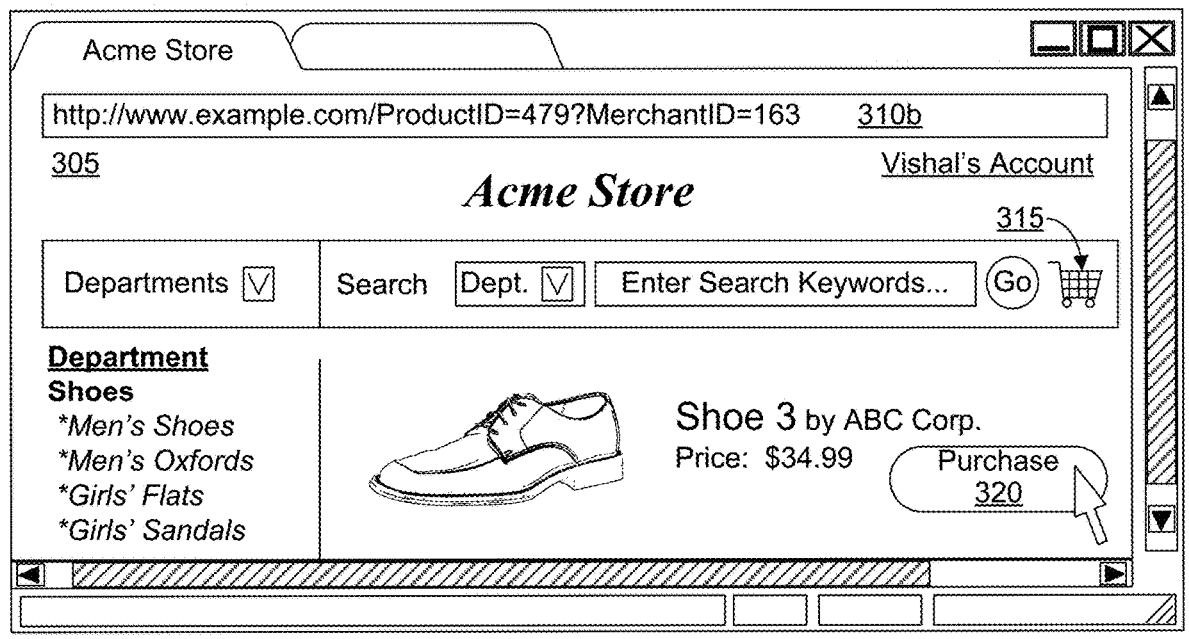
Figure 3C:
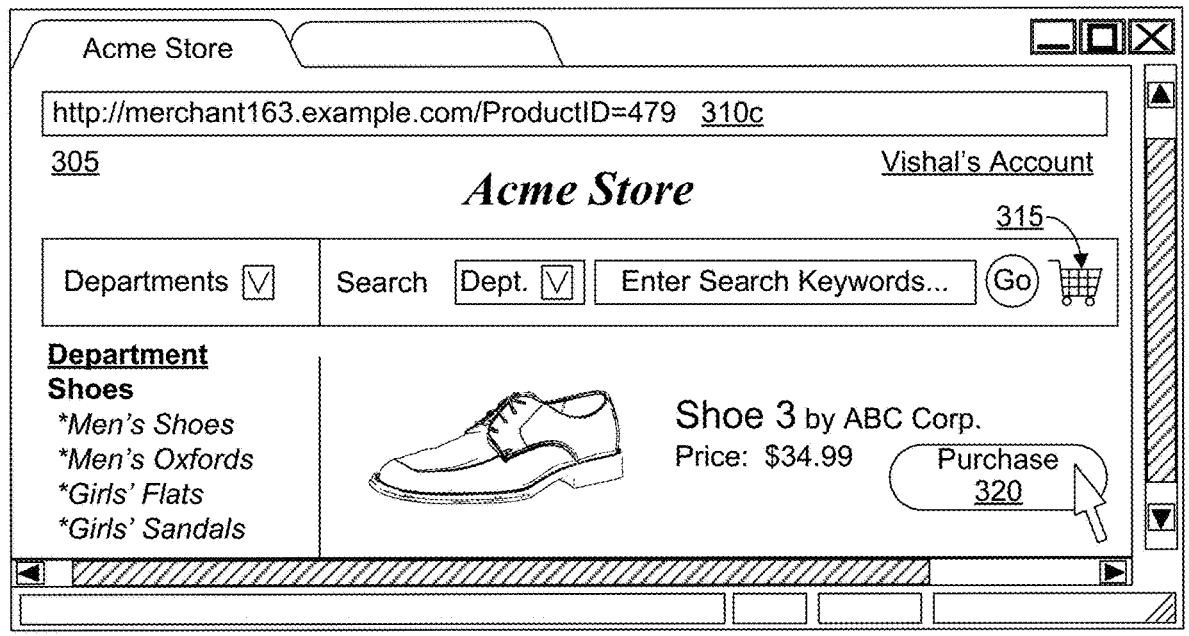
Figure 3D:
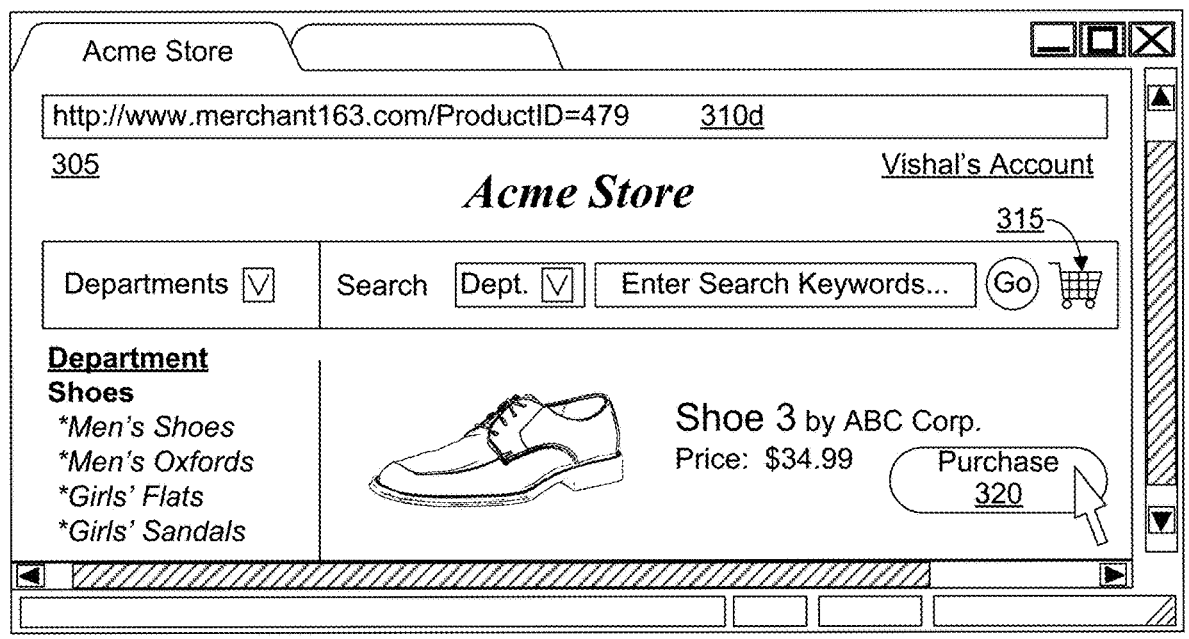

Although the embodiments described with respect to FIGS. 3A-3B use internet technologies to disseminate the catalog documents, any of a variety of document types and electronic dissemination technologies may also be used. For example, purchase intents, purchase completions and so forth may be in the form of e-mail messages, social network posts, text messages, instant messages, audio or video communications and so forth that may be disseminated or exchanged by an appropriate server or other device.

In addition, although the implementation in these examples is described in the context of a website for an electronic store visited using an internet browser, the electronic store may disseminate catalog documents or other product information in any of a variety of other formats and using any of a variety of appropriate protocols. Also, although the examples illustrated in FIGS. 3A-3D are provided in the context of a merchant that sells products, the technology may also be used to sell services, including services that may be provided over the internet.

Figure 4:
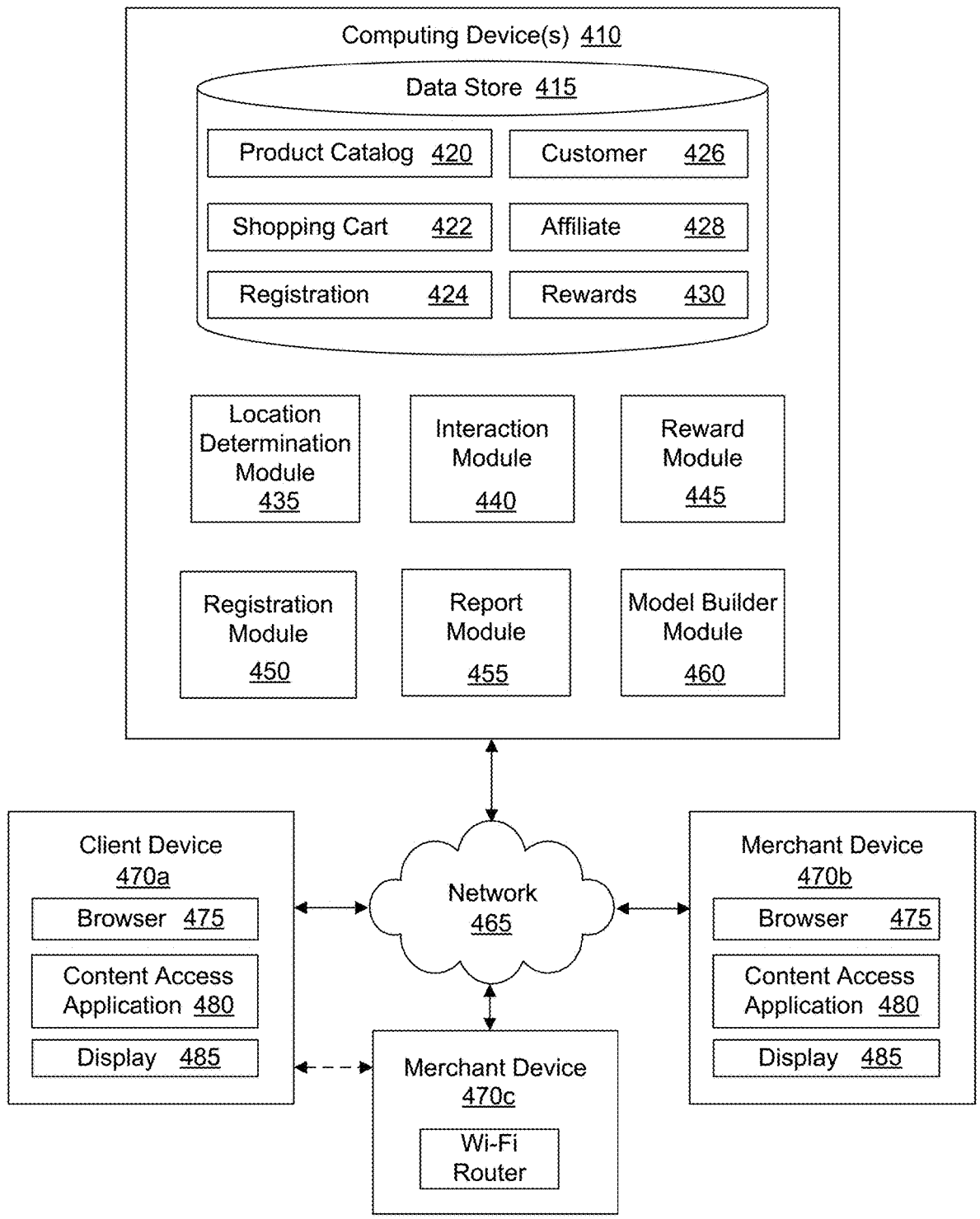
FIG. 4 is a block diagram of a system for rewarding affiliates in accordance with an example of the present technology.

Referring now to FIG. 4, a block diagram of a system for rewarding affiliates is illustrated in accordance with an example of the present technology. The system may be implemented using one or more computing devices 410, such as a server for example, as well as client devices 470*a* and/or merchant devices 470*b*, and may be implemented using or across a network 465. The system may include a data store 415 and a number of modules 435, 440, 445, 450, 455, 460 for storing and processing product, order processing, customer and affiliate data.

While an affiliate may operate a physical store, including inventory, in some examples the affiliate may operate a physical store simply as a showroom where purchases are directed to the electronic store. The operator of the electronic store may manage the tasks of inventory, processing orders, shipping products, collecting payment, providing customer service and so forth. As a result, the affiliate may avoid much of the complexity often involved in managing a physical store. Thus, the affiliate can effectively offer a full retail experience by enrolling as an affiliate and providing a showroom for customers to visit.

In some examples, the affiliate may provide many of the services offered by the electronic store, such as inventory, order processing, payment collection, customer service and the like. The rewards provided to the affiliate may be offered to compensate for customers who visit the physical location to view a product and then purchase from the electronic store for various reasons. In some examples, the affiliate may have limited space or resources for making an inventory of goods available. For example, a book store may have a display model of an expensive art book, but stocking a supply of the art book for potentially rare instances of customers requesting the book may be a challenge when the book store has limited space or resources. However, as an affiliate, the book store may refer customers to the electronic store and/or assist in completion of the purchase to provide the product desired by the customer while receiving compensation for providing the physical store and/or for providing a referral to the electronic store.

As indicated above, the electronic store may enable automated affiliate registration, such as using a registration module 450 operating on computing device 410. The registration process may include: (i) the presentation of an online business agreement to the applicant merchants; (ii) the use of an automated agent to scan the application text for key inputted terms, including vulgarities and other terms that may serve as a basis for denying the application or identifying duplicate, frivolous or fraudulent applications; (iii) the automated generation and assignment of a unique affiliate ID to an applicant; and (iv) the identification or confirmation of a physical location of the affiliate to associate with the affiliate ID, either through receipt of location information from the application, through address/map analysis performed by the electronic store or any other suitable method of physical location identification and/or confirmation.

An applicant merchant may utilize a merchant device 470b (i.e., a computing device) to register as an affiliate. The merchant device 470b may include a conventional internet browser 475 which communicates with the computing device 410 of the electronic merchant using the HTTP protocol. The computing device 410 may access a local registration data store of HTML documents (web pages) which may be requested, retrieved and viewed by the applicant via the browser 475. These documents may, for example, include information about registering to become an affiliate. Access to the electronic store and the registration function via the registration module may be available to any computing device. Other example merchant devices may include computing devices, wireless Wi-Fi routers 470c for customers to access a wireless merchant network to make purchases and so forth.

The system may include a location determination module 435 at the computing device 410. The location determination module 435 may identify, receive or otherwise determine a physical location of a computing device, such as a mobile computing device or client device 470a of a customer visiting the physical location of the affiliate of the electronic store. Although shown as hosted on or executed by the computing device 410 of the electronic store, the location determination module 435 may alternatively be located at, on, or operated by a merchant device 470b or the client device 470a. The physical location of the client device 470a, as determined by the location determination module 435 may be communicated to the computing device 410 when the location determination module is at the client device 470a or the merchant device 470b. For example, when the client device 470a uses NFC to "check in" at the affiliate physical location, this "check in" may be the identification of the location, which may then be transmitted to the computing device 410, at least when the purchase intent is expressed.

The system may include an interaction module 440. The interaction module 440 may identify a purchase intent from the computing device at the physical location. The purchase intent may indicate an intent to purchase a product. The interaction module 440 may identify, for example, when the customer adds the product to a virtual shopping cart or wishlist, or when the customer discusses the product on social media linked to the electronic store or when the customer uses a mobile application for the electronic store to scan the product at the physical store using the client device 470a, or any of a number of other interactions. As with the location determination module 435, the interaction module 440 may alternatively be executed at least partially on the client device 470a or the merchant device 470b. For example, camera software in connection with camera hardware on the client device 470a may detect when an image of the product is captured and notify the computing device 410 of the image capture and this image capture may indicate a purchase intent.

The system may include a reward module 445. The reward module 445 may reward an affiliate at the physical location when the purchase is complete based on the intent to purchase captured at the physical location. The reward module 445 may reward the affiliate even when the purchase is made at a different location than the physical location when the purchase intent is identified while the client device 470a is at the physical location.

The system may include a registration module 450. The registration module 450 may be used to register affiliates, as has been described previously. The affiliate information may be stored in an affiliate data store. The affiliate data store may store information about the affiliate, such as known or confirmed physical locations of the affiliates, products or product types of the affiliates and any other suitable information about or for the affiliates.

The system may include a report module 455. The report module 455 may automatically generate and transmit reports to affiliates, based on information stored by the by the computing device 410. The reports may be generated on a daily, weekly, monthly, annual or other basis. The information contained within these reports may enable the affiliates to review data, such as historical rewards, pending rewards, pending conversion of purchase intents, failed or incomplete conversions of purchase intents to purchases, and so forth. The information in the report may be available on a per-product basis to enable the affiliate to understand: which products are more likely to be purchased from the electronic store as opposed to the physical store, which products have a purchase intent more likely to result in a purchase than others, whether a time of day, week, month, year etc. affects the likelihood of conversion from purchase intent to purchase, whether customers tended to visit other affiliates as well when making purchases and any of a variety of other types of useful data that may be derived from the system of the present technology.

Various other types of information may also be provided within the reports to assist the affiliates in conducting business. For example, the reports may provide anonymous demographic data about the customers that made purchases based on the visit to the affiliate location, including the geographic regions (as determined from shipping addresses) of such customers, as well as other demographic data such as age, gender, nationality, race and so forth for the customers. Additionally, the reports may provide special notices, such as notices about products that pay lower rewards to affiliates, any problems occurring with customer's attempts to purchase while at the affiliate location, and so forth. The report module also may provide affiliates with the ability to access an interactive menu to generate custom reports (such as a report of the number of rewards during a specific period of time), or to set up a report profile that specifies the content, format and frequency of the automated reports.

The data store 415 may include or be configured to store any of a variety of useful types and formats of data. For example, the data store 415 may include a product catalog data store 420. The product catalog data store 420 may include, for example, the products available for purchase from electronic store. The product catalog data store 420 may include text, images, audio, video and so forth, and may include data structured for suitable display on a client device 470a, such as in the form of a webpage or website. In particular, the product catalog data store 420 may include data related to products, such as price, brand, seller, color, size, quantity and so forth. The product catalog data store 420 may also store product identifications, such as numbers or the like, for association of products with product reviews, designation in purchase histories of customers, inventory management and so forth.

The data store 415 may include a customer data store 426. The customer data store 426 may store information such as account information, payment information, contact information, demographic information, purchase history information, personal preferences and so forth. The data store 415 may also include an affiliate data store 428 for storing affiliate data, preferences, location, history and so forth, as has been described previously. The data store 415 may also include a shopping cart data store 422 for storing shopping cart information, at least for a limited time, including the associations of purchase intents with the affiliate based on a physical location of the customer at the time of the purchase intent, as has been described previously. The data store may further include a rewards data store 430 for storing data related to rewards to be awarded to affiliates. The data store may further include a registration data store 424 for storing registration documents, pending registration applications and other registration data involved in registering a merchant as an affiliate. These various data stores may be more fully understood with reference to previous descriptions of these data stores or the data stored by the data stores.

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The interaction module 440, in addition to identifying purchase intents and the like may be further configured to perform machine learning operations on customer data, purchase intents, purchases, affiliate locations and so forth to better understand how customers or customer segments act with respect to options to purchase in a physical store versus at an electronic store, which products are more likely to be purchased in one versus the other, whether demographics of a customer contributes to decisions, conversions and so forth, and any other data. The machine learning may analyze this data to better predict data, such as which new products when added to a virtual shopping cart while at the affiliate location are likely to result in a purchase, how the affiliate may maximize profits based on which products are purchased at the physical store versus the electronic store, how to increase purchases at the physical store relative to purchases at the electronic store or vice versa, and so forth. Machine learning may further be used to analyze the accuracy or success of predicting purchase intents. For example, aggregated data may be analyzed to determine whether a particular action not currently regarded as a purchase intent may be indicative of purchase intent or whether actions currently regarded as a purchase intent may not actually be indicative of purchase intent. Further, machine learning may apply this learning across demographic segments, geographic regions, affiliate chains and so forth to better understand and apply the present technology in any of a variety of different implementations.

The system may include a model builder module 460. The model builder module 460 may use output from the interaction module 440 to create a model for use in predicting customer behavior, purchase patterns and so forth. The learned model may be stored in the data store 415, such as in the affiliate data store, for example, and may be used to provide data and predictions to affiliates. The model builder 460 may personalize the model based on an affiliate profile, affiliate preferences, affiliate reward history, affiliate customer demographics and so forth.

Machine learning may be an effective tool for use in optimizing pattern recognition and rule generation. Machine learning may take empirical data as input, such as data from the customer history, user preferences, and so forth and may yield patterns or new linking rules (e.g., predictions) which may be representative of the underlying mechanism, user thought or interaction process that resulted in the generation of the data. Machine learning systems may take advantage of data to capture characteristics of interest having an unknown underlying probability distribution. Machine learning may be used to identify possible relations between observed variables, such as aspects of user interaction with respect to orders, devices and so forth. Machine learning may also be used to recognize complex patterns and make machine decisions based on input data. In some examples, machine learning systems may generalize from the available data to produce a useful output, such as when the amount of available data is too large to be used efficiently or practically.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive Bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub-symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure.

Client devices 470*a* may access data, content pages, messages and so forth via the computing device 410 over a network 465. Example client devices 470*a* may include, but are not limited to, a desktop computer, a laptop, a tablet, a mobile device, a television, a cell phone, a smart phone, a hand held messaging device, a personal data assistant, an electronic book reader, heads up display (HUD) glasses, a car navigation system, or any device with a display 485 that may receive and present the message content.

Customers may be identified when accessing the customer service server via various methods, such as a unique login and password, a unique authentication method, unique identifying information such as an email address or phone number, an Internet Protocol (IP) address of the user's computer, an HTTP (Hyper Text Transfer Protocol) cookie, a GPS (Global Positioning System) coordinate, or using similar identification methods. A customer may have an account with the server, service or provider, which may optionally track customer preferences, profile information and so forth.

The system may be implemented across one or more computing device(s) 410, connected via a network 465. For example, a computing device 410 may include a data store and various engines and/or modules such as those described above and such modules may be executable by a processor of the computing device. The system may be implemented as a plurality of computing nodes, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various embodiments, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various applications and/or functional entities described. The components executed on the computing device may include the modules described, as well as various other applications, services, processes, systems, engines or functionality not discussed in detail herein.

The client devices shown in FIG. 4 are representative of a plurality of client devices 470*a* that may be coupled to the network 465. The client devices 470*a* may communicate with the computing device over any appropriate network, including an intranet, the Internet, a cellular network, a local area network (LAN), a wide area network (WAN), a wireless data network or a similar network or combination of networks.

Each client device 470*a* may include a respective display 485. The display 485 may comprise, for example, one or more devices such as cathode ray tubes (CRTs), liquid crystal display (LCD) screens, gas plasma based flat panel displays, LCD projectors, or other types of display devices, etc.

Each client device 470*a* may be configured to execute various applications such as a browser 475, a respective page or content access application 480 for an electronic retail store and/or other applications. The browser 475 may be executed in a client device 470*a*, for example, to access and render content pages, such as web pages or other network content served up by the computing device 410 and/or other servers. The content access application 480 may be executed to obtain and render for display content features from the server or computing device, or other services and/or local storage media.

In some embodiments, the content access application 480 may correspond to code that is executed in the browser 475 or plug-ins to the browser 475. In other embodiments, the content access application 480 may correspond to a stand-alone application, such as a mobile application. The client device may be configured to execute applications beyond those mentioned above, such as, for example, mobile applications, email applications, instant message applications and/or other applications. Users at client devices 470*a* may access content features through content display devices or through content access applications 480 executed in the client devices 470*a*.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Various embodiments of the present technology may be used in environments other than the customer support examples provided above. For example, some embodiments may be used for instructional purposes, such as a classroom or online learning environment. A student may utilize a support application with similar functionality as the customer support application described above, for connecting and re-connecting with other students, faculty and so forth. Other embodiments of the present technology may be utilized in any other context in which one or more user computing devices or communication devices communicate with one or more support computing devices or communication devices via one or more one-way or two-way communication channels.

Figure 5:
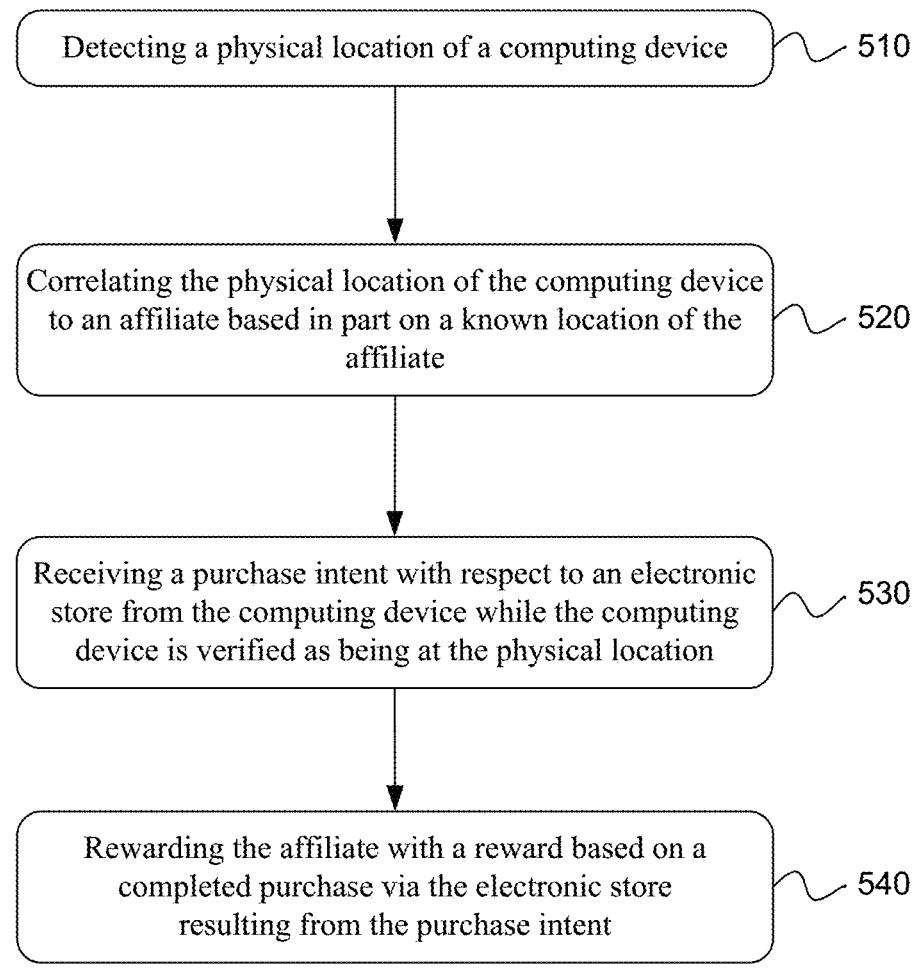
FIGS. 5-6 are flow diagrams for methods of rewarding affiliates in accordance with examples of the present technology.
Figure 6:
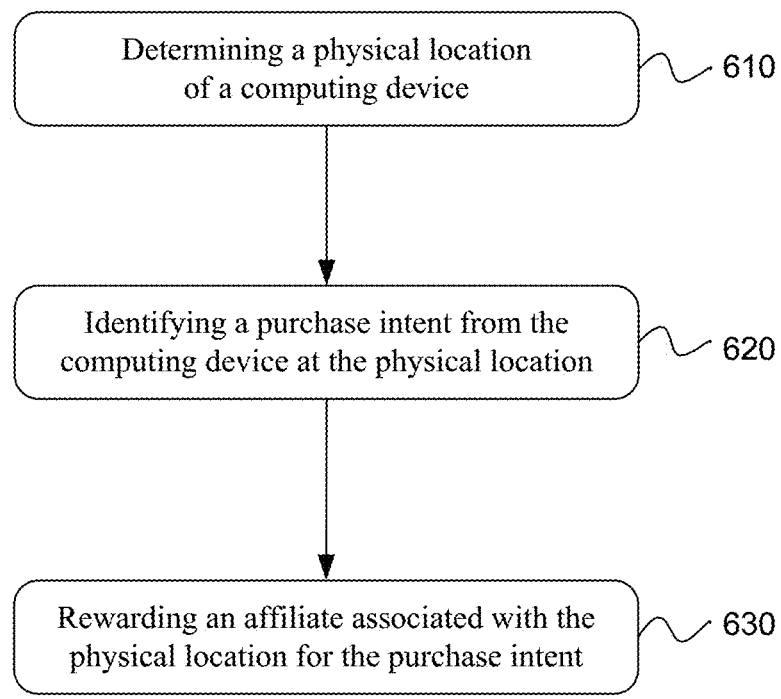

FIGS. 5-6 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring now to FIG. 5, a flow diagram of a method is illustrated for rewarding an affiliate in accordance with an example of the present technology. The method may include detecting 510 a physical location of a computing device. The physical location may be detected using GPS, cellular signal triangulation or any of a variety of other suitable technologies enabled through the computing device, some examples of which have been described previously. The method may further include correlating 520 the physical location of the computing device to an affiliate based at least in part on a known location of the affiliate. In other words, the method presupposes registration of the affiliate with the electronic store, including confirmation of the physical location of the affiliate. The known location is the confirmed physical location. The affiliate may be the entity located at the physical location providing goods or services for sale, rent, lease, etc.

The method may include receiving 530 a purchase intent with respect to the electronic store from the computing device while the computing device is verified as being at the physical location. The purchase intent may be any of a variety of indicators indicating a probable intention to purchase a product or service, one example of which includes adding a product to a virtual shopping cart, or the purchase intent may include the actual or completed purchase of the product. In one example, when the purchase intent is received, a location of the computing device may be determined at approximately the same time, shortly before, or shortly after the purchase intent such that location of the computing device at the physical location at the time of the purchase intent may be confirmed with relative certainty. The method may include rewarding 540 the affiliate with a reward based on a completed purchase via the electronic store resulting from the purchase intent.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 6, a flow diagram of a method for rewarding affiliates is illustrated in accordance with an example of the present technology. The method may include determining 610 a physical location of a computing device, identifying 620 a purchase intent from the computing device at the physical location, and rewarding 630 an affiliate associated with the physical location for the purchase intent. Determining the physical location may include receiving global positioning system location data, receiving cellular triangulation data, identifying an internet protocol (IP) address of the computing device, identifying a network to which the computing device is connected, receiving near field communications, identifying a QR code, detecting and/or connecting to a Bluetooth device at or associated with the physical location of the affiliate, or any of a variety of other location determination methods. The method may include assigning a granularity of physical location resolution for rewarding the affiliate based on a proximity of the affiliate to other affiliates.

When registration of a physical product for sale at the physical location is received from the affiliate, the method may include determining whether the purchase intent includes a purchase intent for purchasing the physical product registered for the affiliate. When registration of a type of physical product for sale at the physical location is received from the affiliate, the method may include determining whether the purchase intent includes a purchase intent for purchasing one or more physical products corresponding to the registered type of physical product. Registration of product types or categories may simplify a registration process for an affiliate, particularly if individual products are frequently replaced by other different products that belong to a same category (e.g., swapping out one computer make or model for a different computer make or model).

The purchase intent may be identified from any one or more of a variety of different activities or actions. As an example, the purchase intent may be identified from a customer capturing an image of a product at the physical location using the computing device. The physical location may be determined by identifying location data embedded in the image, such as may be available from a GPS device in communication with the image capture device. Many image capture devices include GPS or other location data in an Exchangeable image file format (Exif) that may be accessed for identifying the location. Object recognition, barcode scanning technologies and the like may be used to identify the product captured in the image. When the product is identified and the location of the image corresponds to the affiliate physical location, and a purchase of the product is made within a predefined time period, then the affiliate may be rewarded for the purchase.

The method may also include providing varying rewards to the affiliate for different purchase intents identified for customers of the affiliate. For example, a first reward may be provided for the addition of a product to a shopping cart while a second, different reward may be provided for the completion of a purchase of the product.

Similarly as mentioned in the description of the method illustrated in FIG. 5, additional example details, operations, options, variations, etc. that may be part of the method illustrated in FIG. 6 have been described previously herein and/or are described in further detail below. Various systems, devices, components, modules and so forth for implementing the method may also be used, as described with respect to the various examples included in this disclosure.

Figure 7:
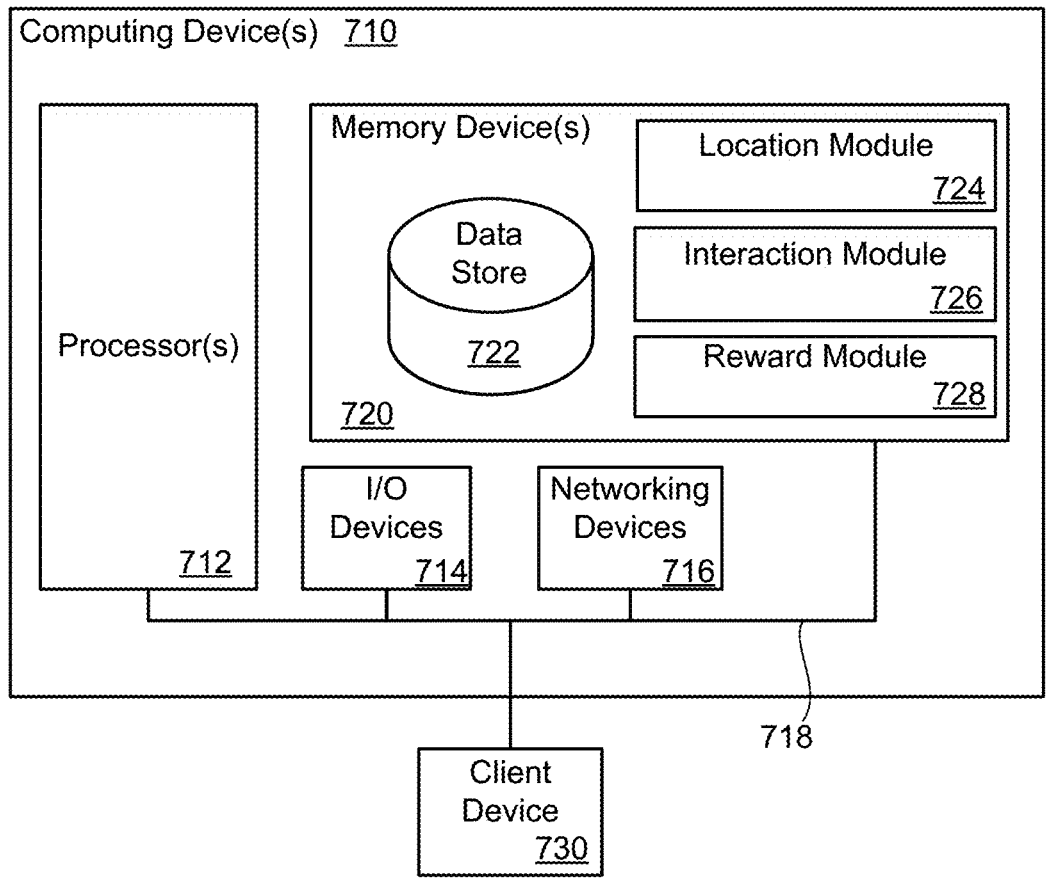
FIG. 7 is a block diagram of a computing system for rewarding affiliates in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules (i.e., location module 724, interaction module 726, reward module 728) that are executable by the processor(s) and data for the modules. A data store 722 may also be located in the memory device 720 for storing data related to the modules and other applications along with an operating system that is executable by the processor(s) 712.

The computing device 710 may further include or be in communication with a client device 730, which may include a display device. The client device 730 may be available for an administrator to use in interfacing with the computing device 710, such as to review or make improvements to machine learning models or linked data and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. An affiliate rewards system, comprising at least one processor and a memory storing instructions, that upon execution by the at least one processor, configure the affiliate rewards system to:
   determine a physical location of a computing device after the computing device checks in with a second computing device at the physical location, the physical location corresponding to an affiliate, the affiliate registered to participate in a rewards program associated with an electronic store by at least associating a category of products with the rewards program;
   determine an interaction between the computing device and the electronic store while the computing device is at the physical location, the interaction related to a product that belongs to the category and that is available from the electronic store;
   determine a first time of a purchase intent, the first time corresponding to the interaction between the computing device and the electronic store while the computing device is at the physical location, the purchase intent indicating an intent to purchase the product from the electronic store;
   determine a second time of a purchase of the product from the electronic store via the computing device, the second time corresponding to a different interaction between the computing device and the electronic store while the computing device is at a different physical location;
   determine a difference between the second time and the first time;
   determine a threshold amount of time defined based at least in part on a value of the product;
   determine that the difference is less than the threshold amount of time; and
   indicate, in the rewards program and based at least in part on the second time being less than the threshold amount of time from the first time, a reward to the affiliate.

2. The system of claim 1, wherein the purchase intent comprises adding the product to a virtual shopping cart.

3. The system of claim 1, wherein the affiliate and other affiliates are registered in a data store with known physical locations of the affiliate and the other affiliates, and wherein products of the affiliate and other affiliates are further registered in the data store such that the the affiliate is rewarded when the products registered in the data store are purchased.

4. The system of claim 1, wherein the computing device checks in with the second computing device using at least one of: a quick response (QR) code, a near field communication (NFC) tag, by connecting to a Bluetooth device, or connecting to a Wi-Fi network associated with the physical location.

5. The system of claim 1, wherein the purchase intent further comprises receiving a uniform resource locator (URL) and the URL is modified based on the physical location.

6. The system of claim 1, wherein the reward is provided to the affiliate for the purchase intent with the electronic store as if the purchase intent is independent of a purchase process.

7. The system of claim 1, wherein the physical location is physically proximate to other affiliates and a granularity of physical location resolution is assigned for rewarding the affiliate based on a proximity of the physical location to the other affiliates.

8. The system of claim 1, wherein the reward varies from rewards to the affiliate for different purchase intents identified for customers of the affiliate.

9. The system of claim 1, wherein the purchase intent includes receiving at least one of a identifier of the product added to an electronic wishlist or receiving the identifier shared over a social network, and wherein the reward is provided to the affiliate when the purchase is made as a result of the adding of the product to the electronic wishlist or the sharing of the product over the social network.

10. An affiliate rewards system, comprising:
at least one processor and at least one memory configured to:
determine a physical location of a computing device after the computing device checks in with a second computing device at the physical location, the physical location corresponding to an affiliate, the affiliate registered to participate in a rewards program associated with an electronic store by at least associating a category of products with the rewards program;
determine an interaction between the computing device and the electronic store while the computing device is at the physical location, the interaction related to a product that belongs to the category and that is available from the electronic store;
determine a first time of a purchase intent, the first time corresponding to the interaction between the computing device and the electronic store while the computing device is at the physical location, the purchase intent indicating an intent to purchase the product from the electronic store;
determine a second time of the purchase of the product from the electronic store via the computing device, the second time corresponding to a different interaction between the computing device and the electronic store while the computing device is at a different physical location;
determine a difference between the second time and the first time;
determine a threshold amount of time defined based at least in part on a value of the product;
determine that the difference is less than the threshold amount of time; and
indicate, in the rewards program and based at least in part on the second time being less than the threshold amount of time from the first time, a reward to the affiliate.

11. The system of claim 10, wherein the purchase intent comprises adding the product to a virtual shopping cart.

12. The system of claim 10, wherein the affiliate and other affiliates are registered in a data store with known physical locations of the affiliate and the other affiliates, and wherein products of the affiliate and other affiliates are further registered in the data store such that the affiliate is rewarded when the products registered in the data store are purchased.

13. The system of claim 10, wherein the computing device checks in with the second computing device using at least one of: a quick response (QR) code, a near field communication (NFC) tag, by connecting to a Bluetooth device, or connecting to a Wi-Fi network associated with the physical location.

14. The system of claim 10, wherein the purchase intent further comprises receiving a uniform resource locator (URL) and the URL is modified based on the physical location.

15. The system of claim 10, wherein the reward is provided to the affiliate for the purchase intent with the electronic store as if the purchase intent is independent of a purchase process.

16. The system of claim 10, wherein the physical location is physically proximate to other affiliates and the physical location is assigned a granularity of resolution for rewarding the affiliate based on a proximity of the physical location to the other affiliates.

17. The system of claim 10, wherein the purchase intent includes receiving at least one of an identifier of the product added to an electronic wishlist or receiving the identifier shared over a social network, and wherein the reward is provided to the affiliate when the purchase is made as a result of the adding of the product to the electronic wishlist or the sharing of the product over the social network.

18. A method implemented by a computer system, the method comprising:
determining a physical location of a computing device after the computing device checks in with a second computing device at the physical location, the physical location corresponding to an affiliate, the affiliate registered to participate in a rewards program associated with an electronic store by at least associating a category of products with the rewards program;
determining an interaction between the computing device and the electronic store while the computing device is at the physical location, the interaction related to a product that belongs to the category and that is available from the electronic store;
determining a first time of a purchase intent, the first time corresponding to the interaction between the computing device and the electronic store while the computing device is at the physical location, the purchase intent indicating an intent to purchase the product from the electronic store;
determining a second time of the purchase of the product from the electronic store via the computing device, the second time corresponding to a different interaction between the computing device and the electronic store while the computing device is at a different physical location;
determining a difference between the second time and the first time;
determining a threshold amount of time defined based at least in part on a value of the product;
determining that the difference is less than the threshold amount of time; and
indicating, in the rewards program and based at least in part on the second time being less than the threshold amount of time from the first time, a reward to the affiliate.

19. The method of claim 18, wherein the threshold amount of time is further based at least in part on the product category.

* * * * *